(12) United States Patent
Sachs et al.

(10) Patent No.: US 6,449,526 B1
(45) Date of Patent: Sep. 10, 2002

(54) MACHINE TOOL WITH AUTOMATIC PROCESS CONTROL AND MONITORING

(75) Inventors: Carsten Sachs, Hannover; Oliver Wenke, Neustadt; Christopher Morcom, Celle, all of (DE)

(73) Assignee: Walter A.G. (DE)

( * ) Notice: Subject to any disclaimer, the term of this patent is extended or adjusted under 35 U.S.C. 154(b) by 0 days.

(21) Appl. No.: 09/386,125

(22) Filed: Aug. 30, 1999

(30) Foreign Application Priority Data

Sep. 8, 1998 (DE) .......................................... 198 40 801

(51) Int. Cl.$^7$ .............................................. G06F 19/00
(52) U.S. Cl. ........................ 700/164; 700/173; 700/176; 700/195
(58) Field of Search ................................ 700/159, 164, 700/186, 187, 193, 195, 173, 174, 175, 176

(56) References Cited

U.S. PATENT DOCUMENTS

| 3,970,830 | A | * | 7/1976 | White et al. ............ 235/151.11 |
| 4,505,074 | A | * | 3/1985 | Kogure ..................... 51/165.77 |
| 5,208,763 | A | * | 5/1993 | Hong et al. ............. 364/551.02 |
| 5,251,156 | A | * | 10/1993 | Heier et al. .................. 364/559 |
| 5,323,572 | A | * | 6/1994 | Guenin ..................... 51/165.87 |
| 6,227,940 | B1 | * | 5/2001 | Bartlett et al. ................. 451/10 |

FOREIGN PATENT DOCUMENTS

| DE | 40 22 799 | 1/1992 |
| DE | 196 26 204 | 1/1997 |
| DE | 196 16 353 | 10/1997 |
| EP | 0 264 445 | 2/1986 |

* cited by examiner

*Primary Examiner*—Paul P. Gordon
(74) *Attorney, Agent, or Firm*—Leydig, Voit & Mayer, Ltd.

(57) ABSTRACT

In a grinding machine a measurement arrangement is provided for the monitoring of the processing of a work piece, especially to make tools. The measuring arrangement uses, preferably, combined transmitted-light and incident-light based techniques so that both the edges and surfaces and depressions on the work piece are detected precisely. The automatic measurements makes it possible to automatically adjust the process parameters for the grinding process so that changes due to temperature drift, mechanical imprecisions of the mechanical system of the grinding machine or wear on the grinding disks are automatically compensated. This makes possible production of relatively large batches within very close tolerances and with high precision.

22 Claims, 4 Drawing Sheets

MACHINE TOOL WITH AUTOMATIC PROCESS CONTROL AND MONITORING

TECHNICAL FIELD

This invention relates to the area of precision machining, and in particular the automated manufacturing or re-manufacturing of tools by grinding work pieces.

BACKGROUND OF THE INVENTION

In the art, tool making machines that implement a fully automatic production process without operator intervention for extended periods of time are known. Work pieces are loaded by a loader into, for example, a grinding machine and precisely ground in accordance with prescribed measurements to make finished tools. Particular attention is paid to the cutting geometries, i.e., the precision of the grinding treatment of the cutting edges and of the surfaces adjacent to the cutting edges of the tools (e.g., free surfaces or chip surfaces).

A German patent, DE 4242506 Cp2, describes a numerically controlled grinding machine for machining work pieces, preferably metal tools. The grinding machine has a grinding head, which may be systematically adjusted by linear translations along and rotations about several axes. The machine also has a similarly adjustable work piece receptacle. A control system, in accordance with a prescribed program, directs drives to adjust the work piece receptacle and the grinding head while grinding work pieces to make tools such as, drills, millers and other chip removing tools.

Ever more stringent quality requirements are leading to demanding tolerances in the manufacture of tools. For maintaining a constant production quality it is, therefore, advantageous to compensate for the influence of interfering factors, such as temperature changes, wear of the grinding disk and the imprecision in the mechanical system. To this end the production process is interrupted in order to check the quality of the tools being produced by external measurements. In case of excessive wear of a grinding disk, a grinding machine must be readjusted in order to stay within an acceptable range. Needless to say, production interruptions and manual readjustments hamper fully automatic operations.

In light of the foregoing discussion, it is desirable to create a device and a process for the metal-removing treatment of work pieces, in particular a grinding machine, with which an interruption-free operation is possible.

SUMMARY OF THE INVENTION

In accordance with the invention, a grinding machine or other processing machine is integrated with a sensor in the form of a measuring arrangement, which considerably simplifies the monitoring of the process with the detection of, possibly, all the relevant quality parameters. Using the integrated system, the tool being ground into a prescribed shape can be checked during and after the treatment process. The integration of the measuring arrangement with the grinding machine makes possible a consistently high production quality, reduces the rate of rejected parts and effectively eliminates the need for manual checking by an operator.

In a preferred embodiment, the sensor is in the form of an optical measuring arrangement. In the case of an optical measuring arrangement it is possible to use, both, glancing-light or transillumination, and direct incident light based techniques. An incident-light illumination permits the recording of inner measurements, such as, for example, chip angle or chip-space depth and the radial position. In contrast, transmitted sight is well suited for the detection of sharp edges such as blade edges. Furthermore, a CCD camera has been notably successful in the context of precise measurements on the outer contour of sharp-edged tools. Consequently, it is possible to replace mechanical sensors with optical sensors and electronic image processing while tracking processing of a work piece.

In accordance with a further aspect of the invention, to permit a high incident light intensity, a mobile illuminating unit, adjustable with respect to the measuring arrangement, is used. If an incident light measurement is to be carried out, the illuminating unit is moved closer to the work piece surface by means of an adjusting arrangement. In this manner, the desired high light intensity may be variably achieved.

To determine whether further processing of the work piece is required, or whether the grinding process can be terminated a final measurement from the sensors is utilized. In the event that a fault cannot be corrected by a renewed working, the work piece is automatically recognized as waste and rejected. In subsequent processing, the grinding program is readjusted to avoid further rejects.

The measurements carried out during the process make possible the detection of a potential fault prior to the production of rejects. If, for example, temperature variations or wear on the grinding disks result in measurement changes, the production process can be altered to stay within the prescribed tolerance. This is made possible by means of a program, executed by a control arrangement, to monitor trends on features approaching. tolerance limits and perform readjustments of the grinding parameters.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
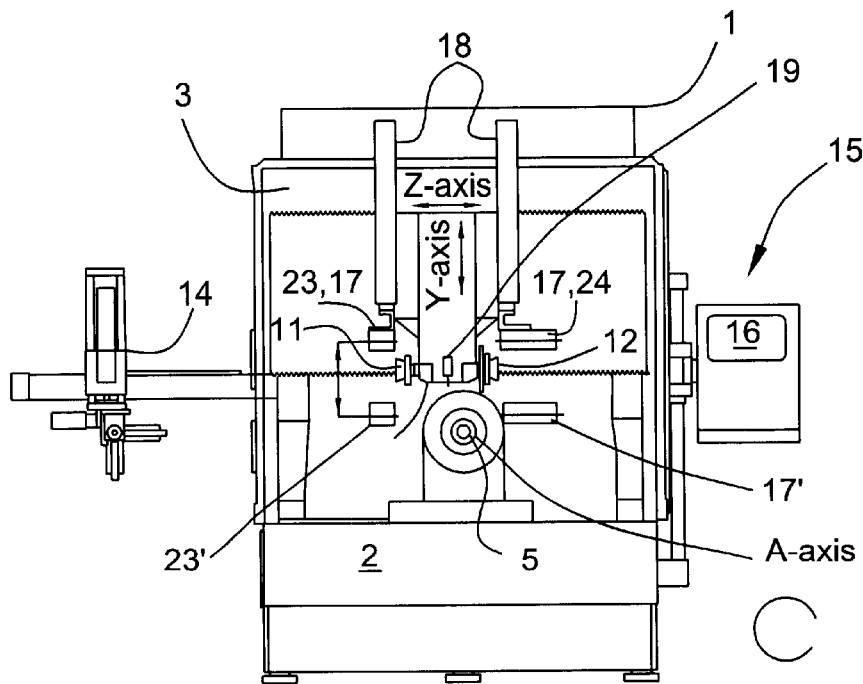
FIG. 1 shows schematic of a front view of a grinding machine with a computerized control arrangement and a loader.
Figure 2:
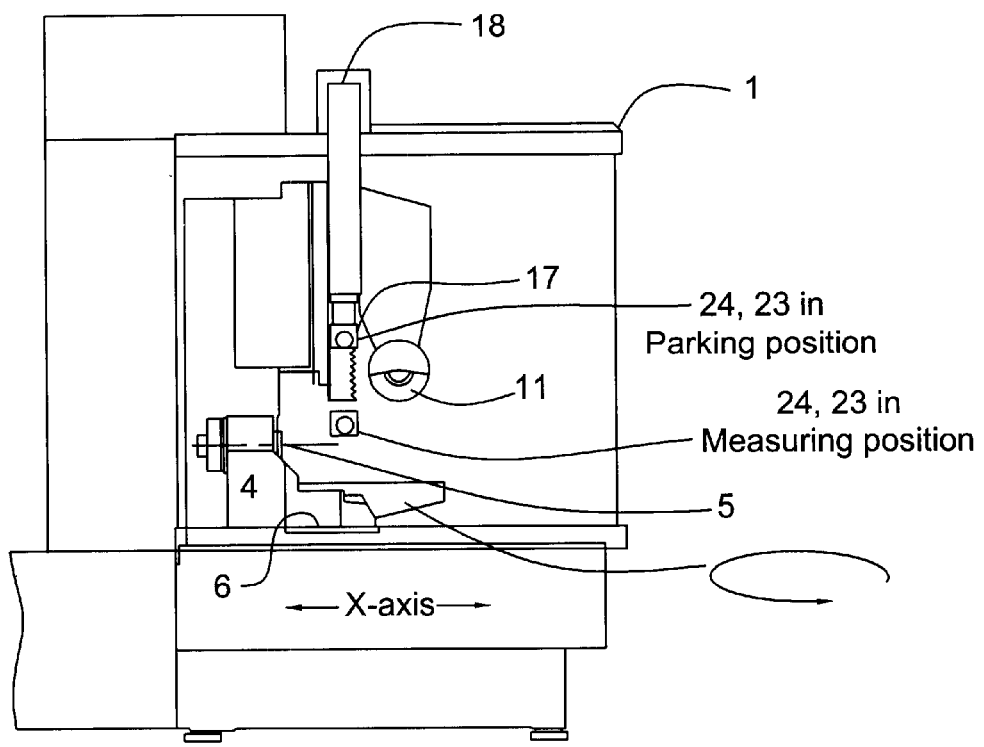
FIG. 2 illustrates a schematic side view of the grinding machine according to FIG. 1.

Turning now to the figures wherein like reference numerals refer to like elements, FIG. 1 illustrates a grinding machine 1 with a base frame or table 2 connected to an upper machine part or upper machine frame 3. FIG. 2 illustrates a side view of the grinding machine shown in FIG. 1, including a work piece receptacle 4, which has a clamping arrangement 5, seen in greater detail in FIG. 1, for holding a work piece, particularly while it is being machined.

A work piece may be positioned by an adjustable arrangement, preferably centrally controllable so that movement of the work piece may be corrected in response to the data obtained from the measurements. The adjustable arrangement also facilitates processing of a large variety of work pieces.

The work piece receptacle 4 shown in FIG. 2 is, preferably, adjustable by translational and/or rotational motion relative to three axes. A slide block 6 permits the shifting of the work piece receptacle 4 along a direction X, which may be horizontal. In addition, the work piece receptacle 4 may be rotated about a vertical axis Y. Precise positioning of the work piece is managed by a swivel drive.

The work piece clamping arrangement 5, shown in FIG. 1, allows rotation of a work piece in the work piece clamping arrangement 5, about an axis, which is shown to be parallel to the X-axis with no loss in generality. A corresponding setting drive can precisely position it about this axis.

FIG. 1 shows an embodiment with a grinding head 8 placed in a slit in the machine frame 3. The machine frame 3 is along the vertical Y-axis, where a horizontal Z-axis is in the plane of the figure while a horizontal X-axis is perpendicular to the plane of the figure. The grinding head 8, which is adjustable relative to the Y-and Z-axes is shown with two turnably driven grinding disks 11, and 12, although it may have more or fewer grinding wheels in other embodiments. The grinding head 8, in some embodiments, may be adjusted along and about additional directions. For example, it may be rotatable to allow it to be held in a tilting position relative to the vertical or the horizontal planes. And, the position of the grinding head 8 may be adjusted by suitable setting drives.

To make measurements on a material-removing tool W to be ground by the grinding machine 1, there is provided a measuring arrangement 17 which operates without contact with the work piece and allows measurements on the partially or fully ground tool W. The measuring arrangement 17 is pneumatically adjustable along one or two axes, preferably with one axis along the Y-direction. These adjustments are facilitated by pneumatic drives 18, which are also controlled by the control arrangement 15. The measuring arrangement 17 can be placed in a parking position away from the work piece W and the tool receptacle 4. The measuring arrangement 17 in its parking position is effectively outside of the working zone and does not disturb the processing of the work piece. In the measuring position 17' the work piece W lies in the light path of the measuring arrangement 17 and in a focal plane of the optics. When measurements have to be made, the measuring arrangement 17 is placed in a measuring position 17' as is shown in FIG. 1.

The measurement data so obtained is initially examined to determine whether and to what extent a feature of interest deviates from a desired value. A follow-up control results in stabilization, i.e., feedback, if a prescribed threshold is exceeded. Furthermore, the follow-up control may be restricted to cases in which the feature of interest consecutively differs from the desired value at least a prescribed number of times. This procedure allows brief deviations from the desired value due to errors in the measurement caused by interference with the tools/sensors to be ignored. The radial and axial positions so obtained can be used for further positioning of the work piece for additional grinding.

To permit a rapid evaluation of a large number of shapes resulting in higher productivity, the measuring arrangement is preferably implemented as an optical measurement arrangement. The measuring arrangement 17 includes a positioning unit 18 for moving the measuring arrangement out of the way during machining (grinding treatment) of the work piece whereby the grinding head 8 and/or other processing tools may be used without obstruction. In order to make measurements on a work piece, the measuring arrangement is placed in a suitable position with the assistance of the positioning unit. In an embodiment of the invention, for example, the measuring arrangement is rotatable about a first axis of the work piece, and about an axis at right angles to the first axis. The measuring arrangement can be adjusted both radially and axially relative to the work piece, thus, making possible measurement of axially set-in lateral cutting edges and the face side with radially set-in cutting edges. Positioning of the measuring arrangement relative to the work piece, using the axes of the work piece carrier, enables measurement of all sides of the work piece.

Preferably, the measuring arrangement is operated intermittently, and, furthermore, in a relationship with the machining operations so that no grinding operations are carried out while measurements are being made. The data generated by the measurements are used to modify the data used by the program controlling the grinding operations. For instance, a correction data set, possibly in the form of a table with offset values and proportionality factors, may be linked to the data prescribing the grinding parameters.

In the grinding machine 1 illustrated in FIG. 1, the measuring arrangement 17 is adjustable vertically. With no loss in generality other axes may be used. Additional sensors may be used to measure parameters of interest. For instance, a tactile sensor 19 shown in FIG. 4 and a light barrier 20, shown in FIGS. 3 and 4, allow a rapid determination of the orientation and of the external dimensions of the work piece. The light barrier facilitates a rough determination of the length of the work piece W as well as a definition of a protective zone around the work piece in order to preclude possible collision resulting from errors in the operation of the grinding machine 1.

Figure 3:
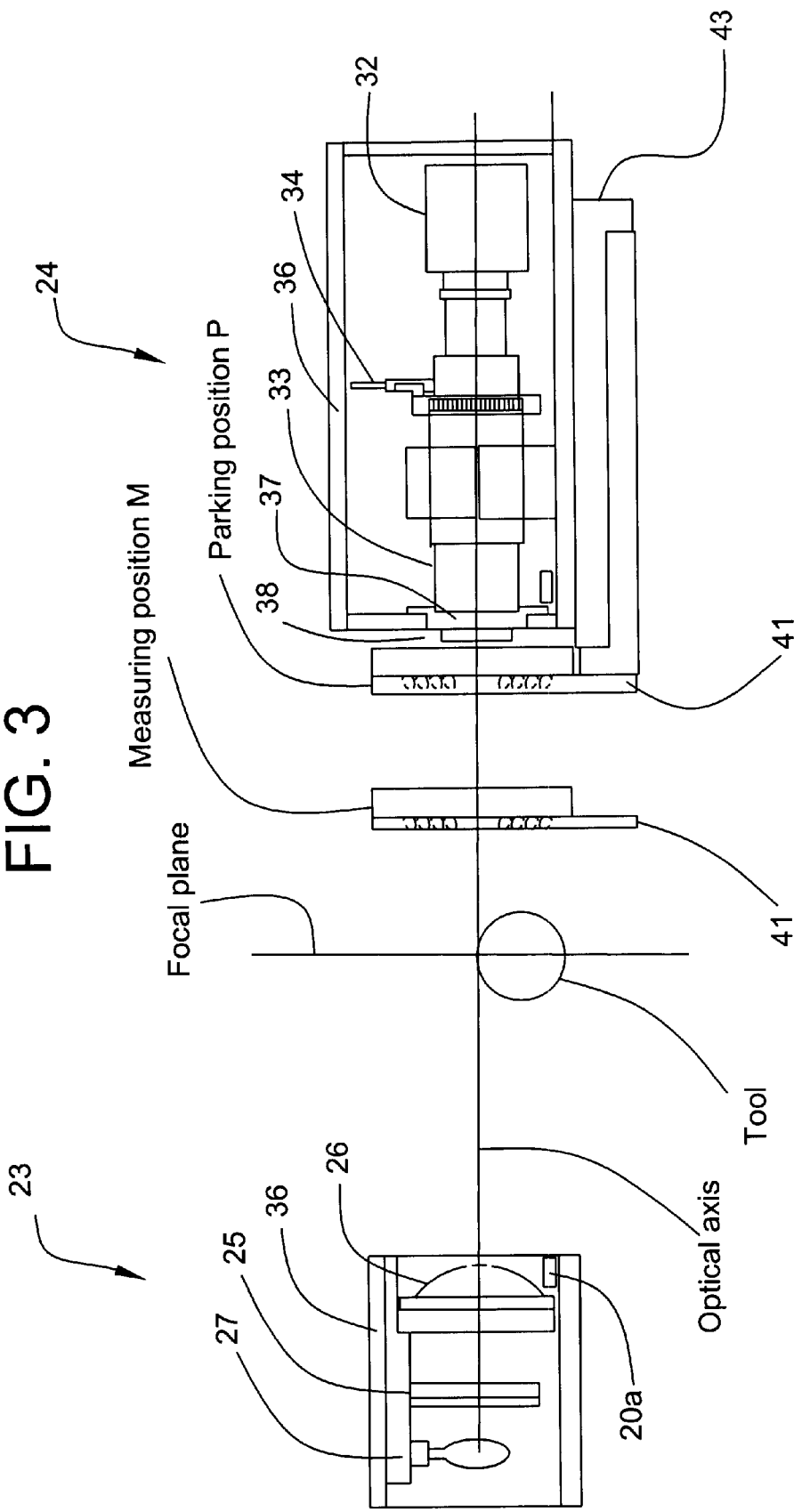
FIG. 3 illustrates a schematic section representation of the optical measuring arrangement of the grinding machine according to FIGS. 1 and 2.
Figure 4:
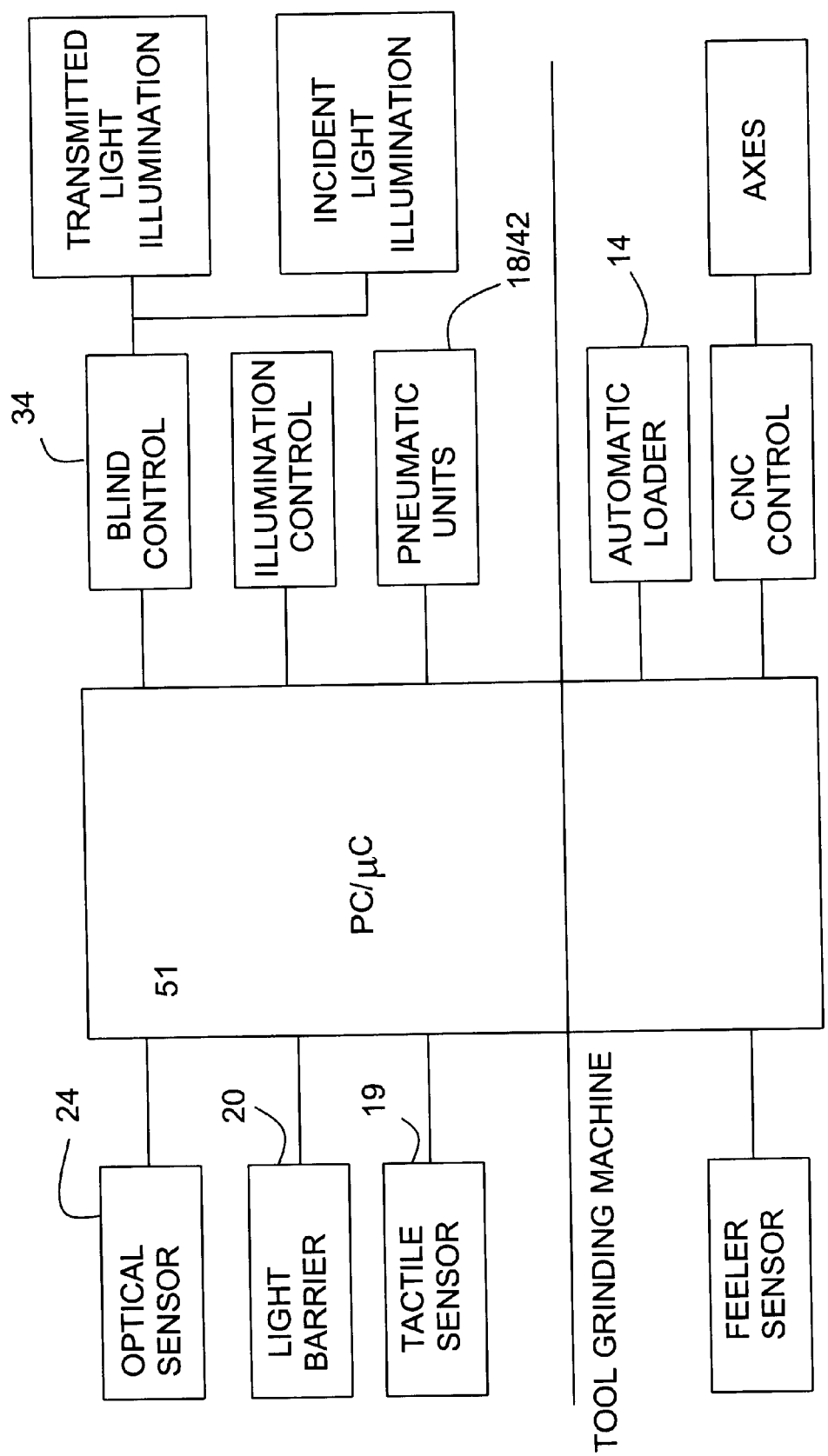
FIG. 4 is a block diagram illustrating the control arrangement of the grinding machine according to FIGS. 1 and 2, and their cooperation with operating elements and sensors.

FIG. 3 illustrates the measuring arrangement 17 with an illuminating unit 23 for generating a parallel light beam, which is more or less blocked by the work piece W, as well as an optical sensor 24 which receives the partially shaded-off light bundle. The illumination unit 23 is adjusted by the pneumatic cylinder 18, shown on the left side in FIG. 1, while the sensor 24 is adjusted by the pneumatic cylinder 18, shown on the right side in FIG. 1. Illumination unit 23 may be placed in the parking position 17 independently of the optical sensor 24.

FIG. 3 shows the illumination unit 23, on one side of the work piece W, with half 20a of the light barrier 20 formed by an interruptible light beam, while the sensor 24 contains another half 20b of the light barrier 20. The work piece W interrupts a light beam between the halves 20a, 20b of the light barrier 20 when the measurement arrangement is in position 17'.

The illumination unit 23 has a collimator for the generation of parallel light rays, consisting of a system of apertures 25 and a lens system 26, and uses light generated at a point source 27. Alternatively, a laser with a beam enlarger can serve as the illumination unit 23.

The sensor 24 contains a CCD camera 32, which may be a line camera or a matrix camera. In front of the CCD camera 32 there is a telecentric optical device 33 with a pneumatic shutter 34. The CCD camera 32, its telecentric optical device 33 and the shutter 34 are in a protective housing 36, which excludes cooling lubricants and oil and has a protective glass 37 to selectively admit light. Furthermore, the protective glass 37 has air nozzles 38 to create an air stream in front of the protective glass 37 to prevent cooling lubricant sprays from depositing on the protective glass 37.

Incident light measurements, as opposed to transillumination measurements, use alternative devices including an incident-light illumination arrangement 41 disposed concentric to an optical axis O. The optical axis O is parallel to the parallel light from the light source 23 to the light sensor 24. The incident light illumination arrangement 41 may be moved parallel to the optical axis O from a parking position P into a measuring position M by means of a pneumatic cylinder 42, that connects the incident-light illumination 41 with a carrier 43 along the housing 36.

The illumination unit 23 facilitates transillumination of the work piece W and detection of its edge geometry, while incident-light illumination 41 is used for measurement of the faces. In order to achieve a high luminous intensity, possibly required in the measurement of the work piece W with incident light, the incident light illumination 41 focuses light on the object work piece W. Incident-light and transillumination measurements, together, allow a determination of the relevant features of the work piece W. The pneumatic shutter control 34 permits switching between trans-illumination and incident illumination. Shutter control 14, and the measuring arrangement 17 are connected to the control arrangement 15 shown in FIG. 4.

The control of the setting drives and a loader 14, used to convey blanks into and remove finished work pieces from the clamping arrangement 5 of the grinding machine 1, is provided by the control arrangement 15. The computerized control 15 is shown with the optional display 16 in FIG. 1.

A central electronic control unit 51, formed by a personal computer or a microcomputer ($\mu$C) 51, is connected to the grinding machine 1 and its constituents, i.e. a. scanner or sensor, the automatic loader 14, units such as pumps, drive motors etc. In addition the control unit 51 handles signals from sensors including the optical sensor 24, the light barrier 20 and a tactile sensor 19. The control arrangement 51 also controls the shutter 34, the pneumatic units 18, 42, and an illumination control 52 for controlling the transillumination unit 23 and the incident light illumination unit 41.

Figure 5:
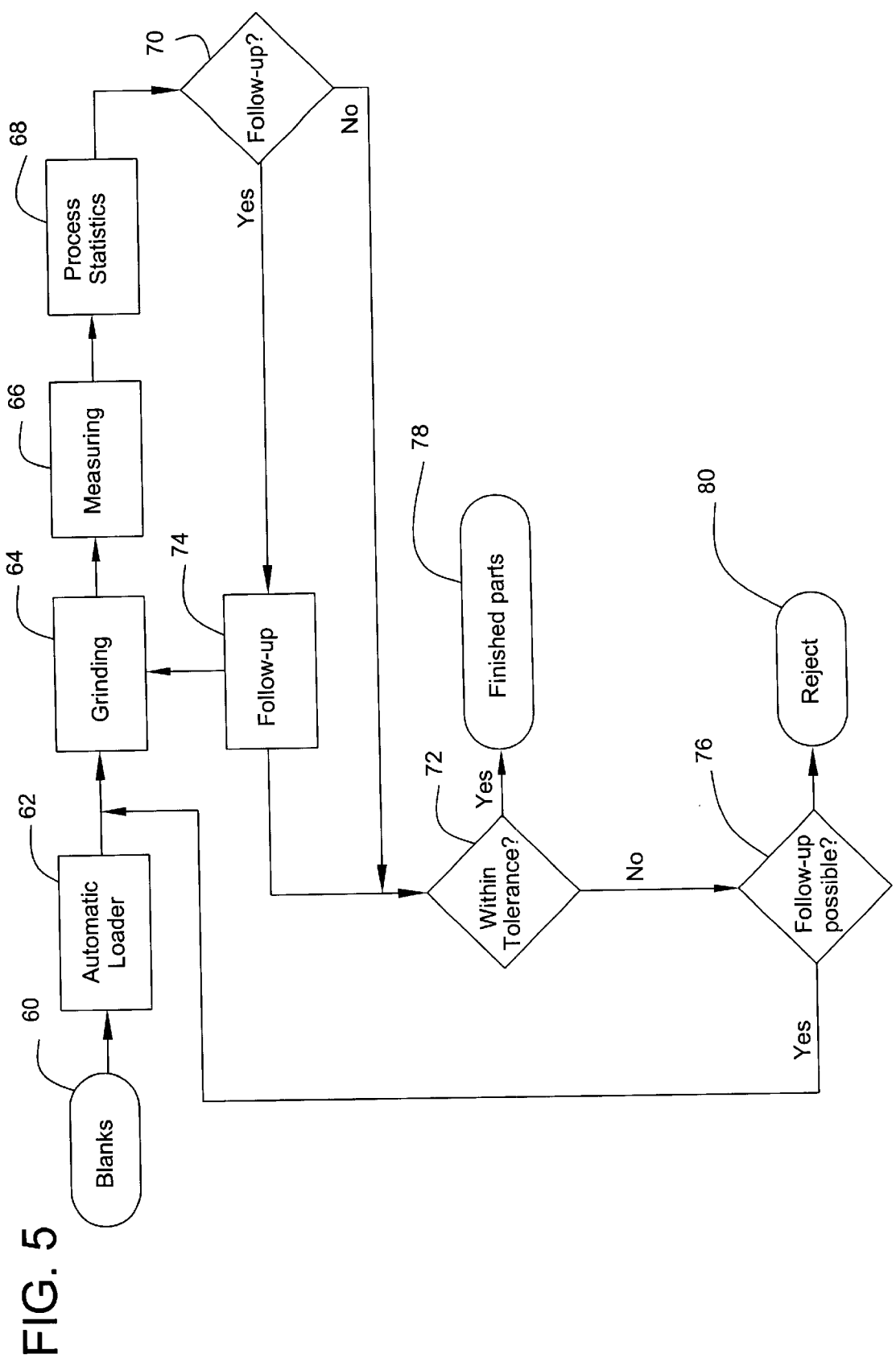
FIG. 5 illustrates a flow diagram of the control run-off of the grinding machine according to FIGS. 1 and 2, and of the control arrangement according to FIG. 4.

The grinding machine 1 operates with the loader 14 supplying a blank 60 to the clamping arrangement 5 at step. 62 as schematically illustrated in FIG. 5. The control unit 51 then starts execution of a grinding program specific for the job (step 64). The grinding program contains all the data and instructions required for the adjustment of the axes of the tool receptacle 4 and of the grinding head 8. In an embodiment, in accordance with the invention, the grinding process is not completed in one stage. If, for example, a free surface is ground before termination of the grinding process an interruption is made.

Measurements are made while the grinding head 8 is removed from the work piece W (step 66) with the pneumatic cylinders 18 triggered to place the illumination unit 23 and the sensor 24 at the work piece W. The light barrier 20 serves there for the positioning of the measuring arrangement 17'. If the cutting edge bounding the free surface is to be measured, the incident light illumination 41 remains in parking position and the shadow of the cutting edge is registered by the CCD camera 32. The position of the shadow and its movement as the work piece W is rotated slowly are evaluated by the control unit 51 and converted into dimensions of the work piece or measurements (step 68).

If an incident light measurement is to be performed, for example, for the measurement of areas or recesses, the illumination unit 23 can remain in, or be moved to, the parking position. The pneumatic cylinder 42 moves the incident-light source 41 from its parking position P to its measuring position M in order to increase the light intensity at the measuring site to a high degree, and the shutter 14 is switched to facilitate incident light measurements.

FIG. 5 illustrates the manipulations performed on the data generated by the measurements. The measurements are used in a "process statistical block" to determine individual parameters, such as the desired value and 30. tolerances and engagement limits or other parameters (step 68). In the next "follow-up" block, the measured and recalculated, possibly statistically revised, values are compared with the desired values or limits (step 70). If the measured values lie within acceptable limits no readjustment of the grinding process is necessary and a finished part 78 is identifiable. On the other hand, if the measured values are not within acceptable limits then a decision has to be made about whether further grinding is required or the work piece has to be rejected as waste (step 72). If further grinding is required, usually if additional material needs to be removed, the function block "follow-up" directs readjustment of the grinding process and the work piece measurements are checked for tolerance in subsequent function blocks (step 74).

The measurements obtained by image processing are processed to detect deviations from the desired value. An incidental deviation from the desired value could result from errors due to interference due to debris or waste at the measuring stage and, therefore, does not immediately result in an alteration of the grinding parameters.

The result of the final measurements leads to a decision on whether a manufacturing step must be repeated, or should the grinding process be terminated (step 76). In the event that a fault cannot be corrected by a renewed working, the part is automatically recognized as reject (step 80).

It is also possible with the measuring arrangement 17 to measure a fully ground work piece completely, without retriggering the grinding machine. In this case the actual values are determined and compared with the desired values and tolerances, and represented graphically and alphanumerically. They can also be logged. A follow-up in this case does not occur.

The use of optical or tactile sensors is not limited to grinding machines, but can be used in nearly all numerically controlled manufacturing systems. The axes present are used for the positioning of the object relative to the sensor. In the grinding machine 1, for example, the axis A serves to turn a circumferential edge of the work piece through the picture field of the CCD camera 32. This presents an economical possibility for producing a constant quality of the production parts. The work piece does not have to be released nor manual intervention required for making measurements, thus increasing the degree of automation.

The use of an optical sensor in conjunction with a modular software packet for the image evaluation allows detection of geometric features such as length, diameters and angles, as well as form features. Remote measurements by optical sensors according to FIG. 3 are especially suited for delicate objects. Such optical sensors can be readily used due to their installation in a sturdy protective housing 36.

During normal measurements both pneumatic cylinders 18 are extended and the work piece is located between the sensor 24 and the illumination unit 23. By adjustments relative to the X-, Y-, Z- and A-axes of the grinding machine 1 the work piece W can be positioned in all directions into the measuring window of the camera 32. For the detection of the face side of the object to be measured (tool W) the transmitted light illumination unit 23 can be driven in and the C-axis swung through 90°. The sensor stays in place there. Thus, the camera 22 detects the complete surface of the work piece, i.e. its circumferential surface as well as its face surface. After execution of the measurement the pneumatic cylinder 18 of the sensor 24 can be retracted and the grinding operation continued. The operations of measuring and grinding can be alternated and manufacturing steps fully monitored. At the end of the grinding process a final measurement of the work piece may be undertaken. Of course, the measurements may be restricted to the final or spot measurements.

The individual measurements may be restricted to part measurements. If, for example, first a chipping surface is ground, then process monitoring may be restricted to this surface. A corresponding statement holds for the processing of other surfaces and edges.

In general, an efficient device for chip-removing machining, particularly to make especially chip-removing tools with blade edges and surfaces for enabling flow of chips during machining is disclosed. The device illustrates integration of machining means, setting means for holding a work piece, which may be a tool, a control arrangement for controlling the shape and orientation of the work piece along with measurements and computing corrections based on the measurements for subsequent machining. The work piece may be raw material or a tool to be refinished. Thus, the machine need not be a grinding machine only, but rather any machine with automated work piece monitoring built in along with control of the actual machining with corrections based on the monitoring.

In particular, a grinding machine 1, a measuring arrangement 17, preferably a combined transmitted-light incident-light measuring arrangement, is provided for monitoring the work piece. This enables a precise detection of edges, for example blade edges, using glancing-light or transmitted-light, and the measurement of surfaces and depressions using incident-light. Automatic measurements by means of the measuring arrangement 17 makes possible automatic control by the control arrangement 15 to readjust the process parameters for the grinding process to compensate for temperature drift, mechanical inaccuracies of the mechanical system of the grinding machine, or wear of the grinding disks. This facilitates manufacturing of relatively large batches comprising products with dimensions within narrow tolerances.

In view of the many possible embodiments to which the principles of this invention may be applied, it should be recognized that the embodiment described herein with respect to the drawing figures is meant to be illustrative only and should not be taken as limiting the scope of invention. Therefore, the invention as described herein contemplates all such embodiments as may come within the scope of the following claims and equivalents thereof.

We claim:

1. A device for grinding work pieces into machine tools, comprising:
    a machining arrangement which presents at least one grinding means and one setting means with which the grinding means and a work piece to be ground into a machine tool can be positioned in relation to one another;
    a control arrangement connected with the setting means adapted to trigger the setting means for the generation of a stipulated from of the machine tool; and
    a measuring arrangement, which, with the control arrangement, performs a measurement on the work piece after grinding and wherein the control arrangement, on establishment of a deviation between the stipulated form and the measurement, performs a correction of settings of the setting means for producing the machine tool.

2. The device according to claim 1, wherein the grinding means of the machining arrangement has at least one grinding head with one or more grinding disks.

3. The device according to claim 1, wherein the setting means are independently adjustable along several axes by drives triggered by the control arrangement.

4. The device according to claim 1, wherein the work piece is held in a holding arrangement.

5. The device according to claim 4, wherein the holding arrangement has an adjusting arrangement by means of which the work piece is movable along one or more axes and is turnable about one or more axes, wherein the adjusting arrangement is controllable by the control arrangement.

6. The device according to claim 1, wherein the measuring arrangement is adjustable linearly at least in one direction by a positioning unit.

7. The device according to claim 1, wherein the measuring arrangement is a contactless measuring arrangement which operates according to incident-light and transmitted-light based techniques.

8. The device according to claim 1, wherein the measuring arrangement operates optionally according to incident-light and transmitted-light based techniques and is switchable between operations based on the two techniques.

9. The device according to claim 1, wherein the control arrangement independently executes the machining process with the aid of a prescribed processing pattern including at least one measurement to check the observance of the stipulated form.

10. The device according to claim 9, wherein the control arrangement, on establishment of a deviation between the stipulated form and the measurement for the current work piece, performs a follow-up at least when an admissible tolerance is first exceeded and the admissible tolerance is attainable with the follow-up.

11. A device according to claim 1, wherein the control arrangement, on establishment of a deviation between the stipulated form and the measurement, performs a follow-up for the next work piece in the machining sequence when an admissible tolerance is first exceeded and the admissible tolerance is no longer attainable with the follow-up.

12. A process for grinding a work piece into a machine tool, the process comprising the steps of:
    grinding the work piece by a controllable machining arrangement having a control arrangement, a machining program and controllable interrupts;
    executing, during a machining pause due to a controllable interrupt, at least one measurement means of a measuring arrangement controlled by the control arrangement to perform a measurement on the work piece after grinding; and
    upon establishment of a deviation between a stipulated form of the machine tool and the measurement on the work piece, correcting settings of the machining program for producing the machine tool with the aid of the executed measurement for further machining.

13. The process according to claim 12, wherein the grinding of a work piece is repeatedly interrupted by the control arrangement and in each thus resulting machining pause a measurement is performed and the grinding process continued after the machining pause with the machining program readjusted responsively to the measurement.

14. The process according to claim 12, wherein the grinding of work pieces is interrupted by the control arrangement for a spot check and a measurement is performed on at least one work piece in a batch.

15. The process according to claim 12, wherein a measurement is made after termination of the grinding operation and the work piece is determined, based on the measurement, to be a finished part or as a work piece lying outside of the tolerance.

16. The process according to claim 15, wherein a work pieces lying outside of the tolerance is examined to determine if reprocessing is possible and, if reprocessing is possible, reprocessing is commenced immediately following the measurement.

17. The process according to claim 12, wherein the measurement includes the geometry of the cutting edges on the work piece and an adjoining area.

18. The process according to claim 12, wherein the determination of an axial position and a radial position of the work piece there is used an optically operating measuring arrangement.

19. The process according to claim 12, wherein the positioning and movement of the work piece relative to the measuring arrangement during the measurement leaves the measuring arrangement at rest during the measuring.

20. A device for grinding work pieces into machine tools, comprising:

a grinding head;

a movable work piece clamp adapted to position a work piece in relation to the grinding head during a programmed grinding operation for grinding the work piece into a machine tool of a desired form;

a controller in communication with the work piece clamp; and a measuring device in communication with the controller;

wherein the measuring device is adapted to perform a measurement on the work piece after grinding and wherein the controller, responsive to the measurement, is adapted to cause the work piece clamp to change the relation of the work piece to the grinding head during the programmed grinding operation based on a deviation between the measurement on the work piece and the desired form of the machine tool.

21. The device as recited in claim 20, wherein the measuring device comprises an optical sensor.

22. The device as recited in claim 20, wherein the measuring device utilizes combined transmitted-light techniques and incident-light based techniques to measure the work piece.

* * * * *